US006857444B2

(12) United States Patent
Davis

(10) Patent No.: US 6,857,444 B2
(45) Date of Patent: Feb. 22, 2005

(54) FLOW-ACTUATED TRAPPED-PRESSURE UNLOADER VALVE

(75) Inventor: Greg Davis, Jefferson, WI (US)

(73) Assignee: Briggs & Stratton Power Products Group, LLC, Jefferson, WI (US)

( * ) Notice: Subject to any disclaimer, the term of this patent is extended or adjusted under 35 U.S.C. 154(b) by 71 days.

(21) Appl. No.: 10/280,909

(22) Filed: Oct. 25, 2002

(65) Prior Publication Data

US 2004/0079411 A1 Apr. 29, 2004

(51) Int. Cl.[7] ................................................ F16K 17/00
(52) U.S. Cl. ............................ 137/115.06; 137/115.11; 137/115.16; 137/597
(58) Field of Search .................... 137/115.06 I, 115.16, 137/115.11, 119.08, 119.09, 119.03, 115.15, 895, 597

(56) References Cited

U.S. PATENT DOCUMENTS 2,188,463 A 1/1940 Mercier
2,395,941 A 3/1946 Rockwell
2,501,593 A * 3/1950 Becker ........................ 138/44
2,772,690 A 12/1956 Mercier et al.
2,960,996 A * 11/1960 Haselton ................ 137/115.16
3,085,588 A * 4/1963 Oliphant et al. ....... 137/119.08
3,183,933 A 5/1965 Whitlock et al.
3,613,997 A * 10/1971 Thompson ............. 137/101.11
3,685,533 A * 8/1972 Krechel ................. 137/115.05
3,707,981 A 1/1973 Sadler et al.
4,470,428 A 9/1984 Bishop et al.
4,644,974 A * 2/1987 Zingg .......................... 138/44
4,726,526 A 2/1988 Ostergaard
5,311,905 A * 5/1994 De Santis ............. 137/115.06
5,427,151 A 6/1995 Pauley
5,538,027 A 7/1996 Adamson et al.
5,755,251 A 5/1998 Simonette
6,053,196 A 4/2000 Körtge

* cited by examiner

*Primary Examiner*—Stephen M. Hepperle
(74) *Attorney, Agent, or Firm*—Michael Best & Friedrich, LLP

(57) ABSTRACT

The invention recites an unloader valve operable to direct a flow of fluid. The valve includes a housing having a bypass opening, an inlet opening, an outlet opening and an internal chamber between the inlet opening and the outlet opening. A shuttle valve is disposed within the internal chamber and is movable between a first position wherein the flow of fluid is substantially directed to the bypass opening and a second position wherein the flow of fluid is directed to the outlet opening. The shuttle valve includes an internal flow path having a venturi therein. A biasing member biases the shuttle valve in the first position.

22 Claims, 6 Drawing Sheets

FLOW-ACTUATED TRAPPED-PRESSURE UNLOADER VALVE

BACKGROUND OF THE INVENTION

The present invention relates to unloader valves, and particularly to unloader valves used with positive displacement pumps. More particularly, the present invention relates to a flow-actuated unloader valve for a pressure washer system.

Pressure washers provide a supply of high-pressure fluid for performing various tasks (e.g., paint and stain removal, drain cleaning, driveway cleaning, etc.). Usually the water is mixed with a cleaning solution such as soap, ammonia solution, bleach, or other chemicals.

Pressure washers often include an engine that drives a high-pressure pump to supply the cleaning fluid. A trigger-actuated valve (i.e., spray gun) mounted to the discharge hose from the pump allows the user to remotely control the supply of high-pressure fluid. When the trigger is depressed, cleaning solution is discharged. When the trigger is released, the flow of fluid stops and the pump is disengaged, the engine is turned off, or the high-pressure fluid is bypassed to avoid causing damage to the pressure washer system. To that end, many pressure washers include unloader valves that bypass fluid back to the fluid reservoir when the fluid is not being discharged.

Unloader valves, sometimes referred to as "bypass valves" or "diverter valves", are used as a control mechanism for pressure washer systems. The unloader valve controls the pressure and the direction of flow within the system. Located between the outlet side of a pump and a discharge device (such as a spray gun), the unloader valve diverts fluid from the pump outlet back to the pump inlet through a bypass passage when the discharge passage becomes blocked (spray gun valve closed), thereby reducing pressure within the pump. When the discharge passage is unobstructed (spray gun valve open), the unloader valve redirects fluid back to the discharge device and allows the pump pressure to rise back to its' normal operating pressure.

Some pressure washer systems include the ability to inject cleaning solution directly into the discharge stream exiting the high-pressure side of the pump. To add cleaning solution, the user premixes the solution with the water or the solution is drawn into the pressure stream by vacuum with the use of a venturi, this method is commonly referred to as "chemical injection". Chemical injection typically requires a separate apparatus adding cost and complexity to the pressure washer. Of the known pressure washer systems to have "chemical injection", all require the use of additional components to perform this task. Such additional components may include a separate venturi, housings, o-rings, etc.

SUMMARY OF THE PREFERRED EMBODIMENTS

The invention provides an unloader valve including a body that engages the pump housing to receive the high-pressure flow from the pump. The preferred valve body design consists of an inlet, an outlet, a bypass passage and an inlet passage for chemical injection. Within the valve body is a shuttle-valve that defines two primary chambers. These two chambers are in fluid communication with one another through a small port (venturi) in the shuttle-valve. The shuttle-valve is movable between a bypass position and a spray position. The shuttle-valve is biased in the bypass position by a spring on the discharge side of the shuttle valve.

Yet another feature of the invention is the cleaning solution inlet. The cleaning solution inlet allows for the admission of a cleaning solution (e.g., soap, ammonia, detergent, bleach, etc.) into the stream of high-pressure water. Flow exiting the high-pressure outlet first passes through a venturi disposed within the movable shuttle valve. The throat area of the venturi is in fluid communication with the cleaning solution inlet. The high-velocity flow through the venturi produces a low-pressure in the throat, thereby drawing the cleaning solution into the venturi.

Combining the cleaning solution inlet and the unloader valve into a single housing greatly reduces the number of parts used. The reduction in parts reduces the cost and complexity of the unloader valve and cleaning fluid inlet.

BRIEF DESCRIPTION OF THE DRAWINGS

The detailed description particularly refers to the accompanying figures in which.

DETAILED DESCRIPTION OF THE DRAWINGS

Most unloader valves have specific operating ranges, limiting their applications and affecting their performance as conditions change within the high-pressure washer system. The "limitation to applications" costs manufactures because it requires different design variations, additional parts that need to be inventoried, additional complexity to the assembly process, and so on. The affects in the unloader valve performance due to variations in the system can be costly to the manufacturer and a nuisance to the user. The additional cost to the manufacturer manifests itself on many different levels. For example, the requirement for multiple adjustments during factory setup (back and forth between the engine speed and the unloader pressure adjustment), higher scrap rates, warranty returns, etc. all increase manufacturing costs. The nuisance to the user would include pulsation in the pump pressure, loss of pressure, or large delays in spray pressure when triggering the spray gun.

Most conventional unloader valves are designed with a high rate spring that will allow the opening of a valve only at some preset pressure. In most cases, this preset pressure only occurs in the form of a high-pressure spike when the spray gun valve is closed. The value of this high-pressure spike is usually well in excess of what the pump can maintain for extended periods. With most of these designs, this high-pressure value must be maintained (or "trapped") within the discharge line and allowed communication against the high-rate spring in order to keep the bypass open. If the "trapped line-pressure" is lowered due to leakage, hose expansion, etc., then the high-rate unloader spring will close the bypass valve, thereby allowing pressure to rise, even though the spray gun valve is still closed. This unwanted increase in pressure during the bypass state, usually results in pressure pulsations within the pump, engine stalls, or even severe pump or engine damage. For these reasons, it would be desirable to have an unloader system that would function in a wide range of operating conditions, does not require large pressure spikes to overcome heavy spring forces, and does not require factory adjustments.

Figure 1:
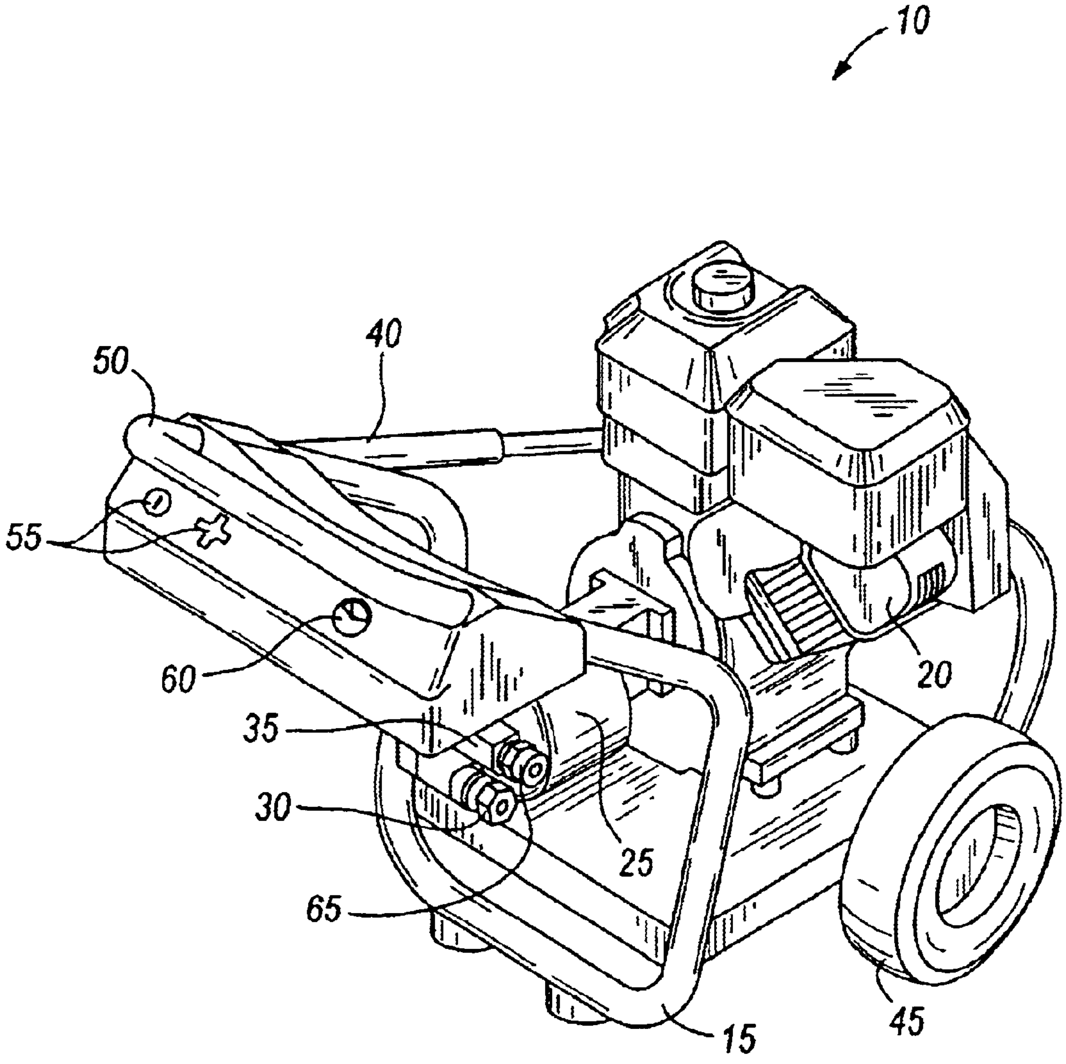
FIG. 1 is a perspective view of a pressure washer including an unloader valve.
Figure 6:
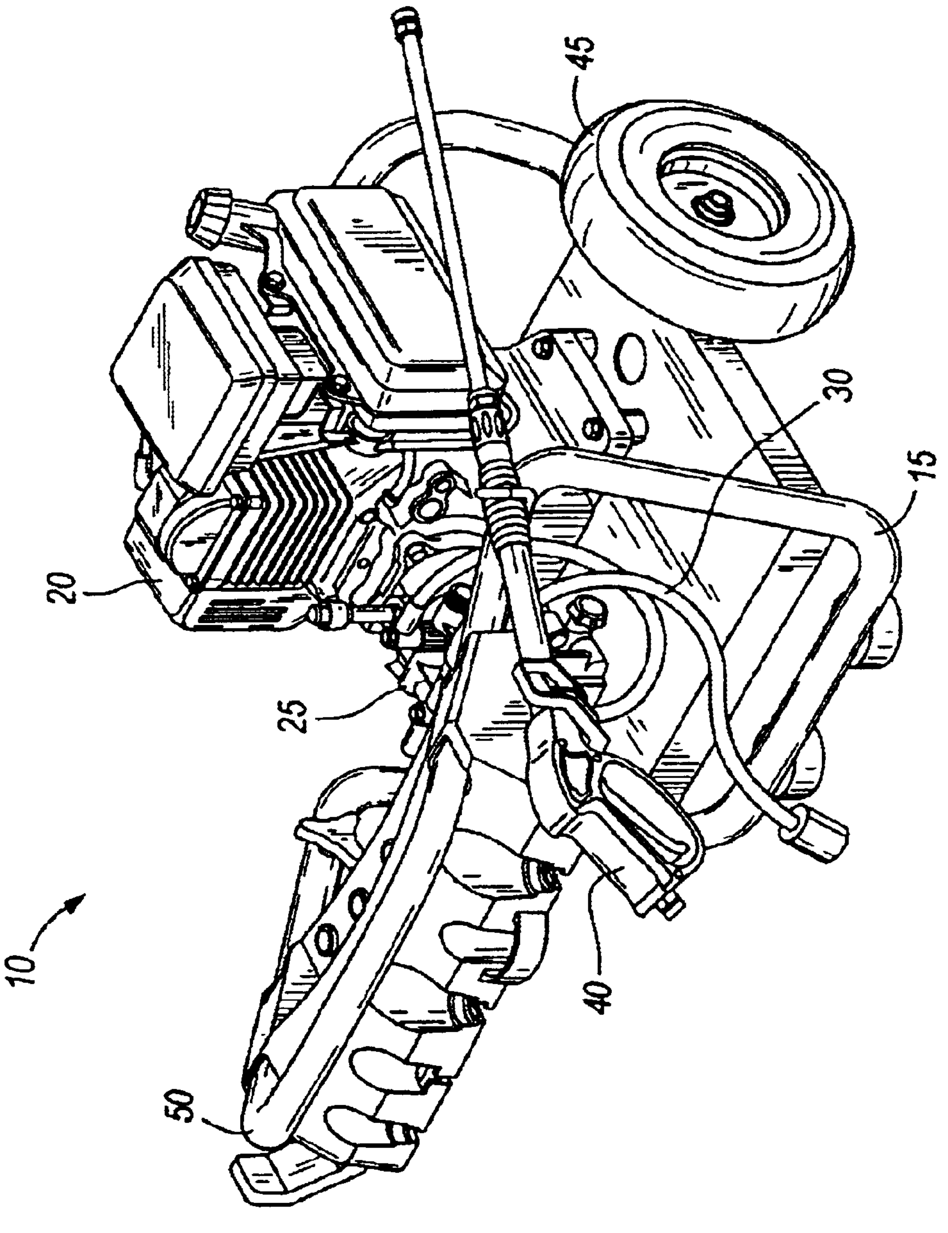
FIG. 6 is a perspective view of a pressure washer.

With reference to FIG. 1, a pressure washer 10 includes a frame 15, a motor or engine 20, a pump 25, various hoses and fittings 30, an unloader valve 35, and a spray gun 40 (shown in FIG. 6). The engine 20 mounts to the frame 15 and drives the pump 25. While FIG. 1 illustrates an internal combustion engine, other types of engines are possible (e.g., diesel, natural gas powered, or electric motors).

The frame 15 is supported for movement by a plurality of wheels 45 and provides support for the various components. As such, the frame 15 is generally manufactured from a structural material (e.g., tubing, channels, or rods made of steel, aluminum, other metals, composites and the like). The frame 15 includes a handle portion 50 that extends above the pressure washer components. The handle 50 provides a convenient point for the user to grasp the pressure washer 10 for movement. In addition, controls 55 (e.g., start/stop buttons, keyholes, etc.) and indicators 60 (e.g., lights, gages, or dials) are often positioned on or near the handle portion 50 to allow the user easy access.

Preferred constructions of the pressure washer 10 include positive displacement pumps 25 (e.g., gear-type pumps, reciprocating pumps, screw pumps etc.). However, other constructions employ other types of pumps such as centrifugal and rotary pumps. The pump 25 receives a flow of fluid at an inlet and discharges a high-pressure flow at an outlet 65. A fluid reservoir supported by the frame 15 provides fluid to the pump inlet. Alternatively, an external source provides fluid to the pump 25. Typically, the fluid used is water however, other fluids can be used (e.g., soap-water solution, ammonia solution, etc.). In some constructions, an operator controls the discharge pressure of the pump 25 via a pressure control valve, or by varying the rotating speed of the engine 20. The user's control of the pressure can be direct (e.g., moving a throttle lever) or indirect (e.g., turning a knob to adjust a pressure switch that in turn controls a relief valve).

Figure 2:
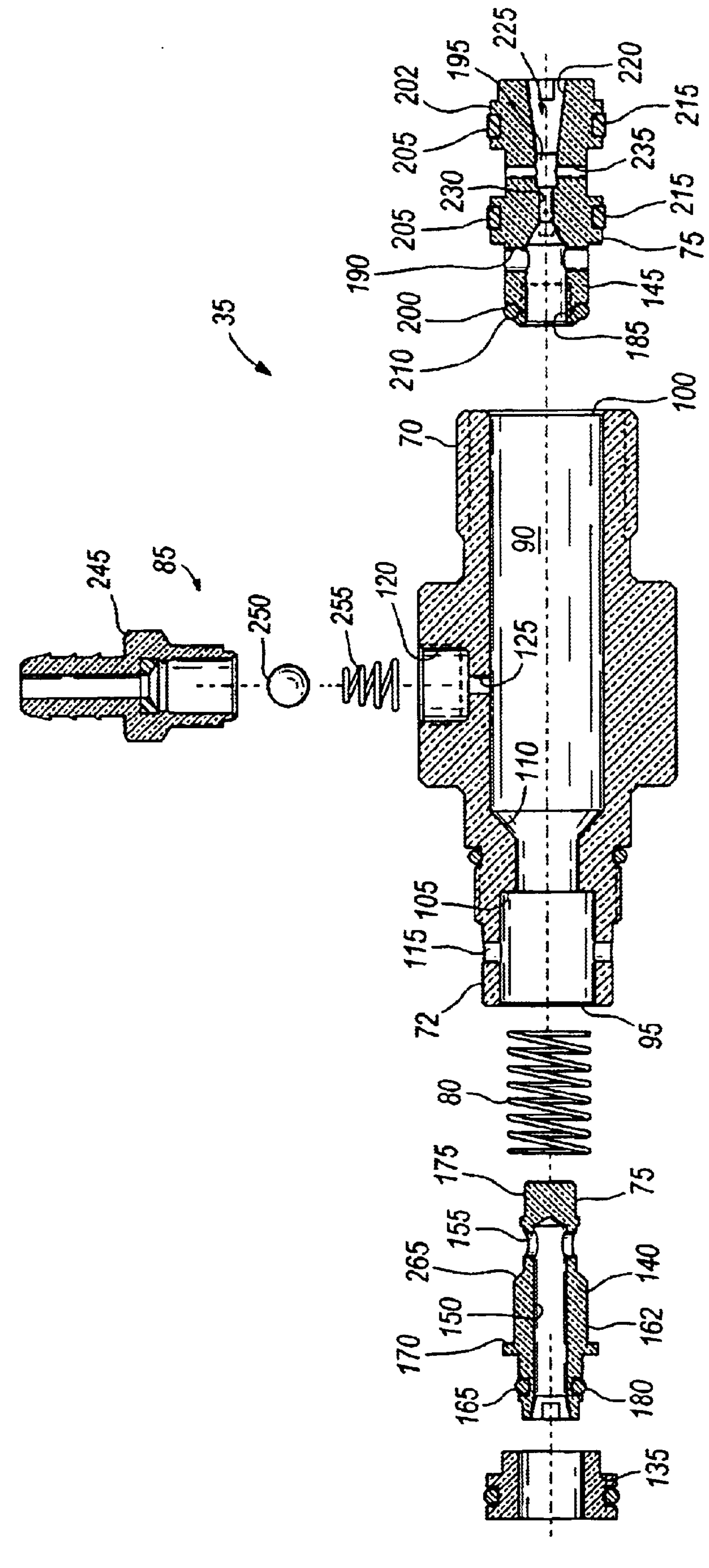
FIG. 2 is an exploded cross-sectional view of the unloader valve of FIG. 1.

As illustrated in FIG. 2, the unloader valve 35 includes a housing 70 that connects directly to the pump outlet 65 (FIG. 1). In preferred constructions, the housing 70 and the pump outlet 65 include threads 72 sized to engage one another. In other constructions, other attachment methods are used (e.g., welding, flange-mounted, or integrated with the pump housing). In still other constructions, the unloader valve 35 is positioned remote from the pump 25.

Referring again to FIG. 2, an exploded view of the unloader valve 35 is shown. The unloader valve 35 includes the housing 70, a movable shuttle valve 75, a biasing member 80, and a chemical injection inlet barb 85.

The housing 70 includes a central chamber 90 that extends from an open inlet end 95 to an open outlet end 100. The chamber 90 includes several cylindrical sections having walls that are substantially parallel to the longitudinal axis 13—13 of the housing 70. In addition, the housing includes a shoulder 105 having a wall that is substantially perpendicular to the longitudinal axis 13—13. The housing 70 also includes an angled wall 110 that defines a frustoconical region.

A series of radial bores 115 extend through the housing 70 near the threaded portion 72 and provide a flow path out of the housing 70. In addition, a large threaded bore 120 extends partially through the housing 70 and is in fluid communication with the interior of the housing 70 via a smaller bore 125.

Figure 3:
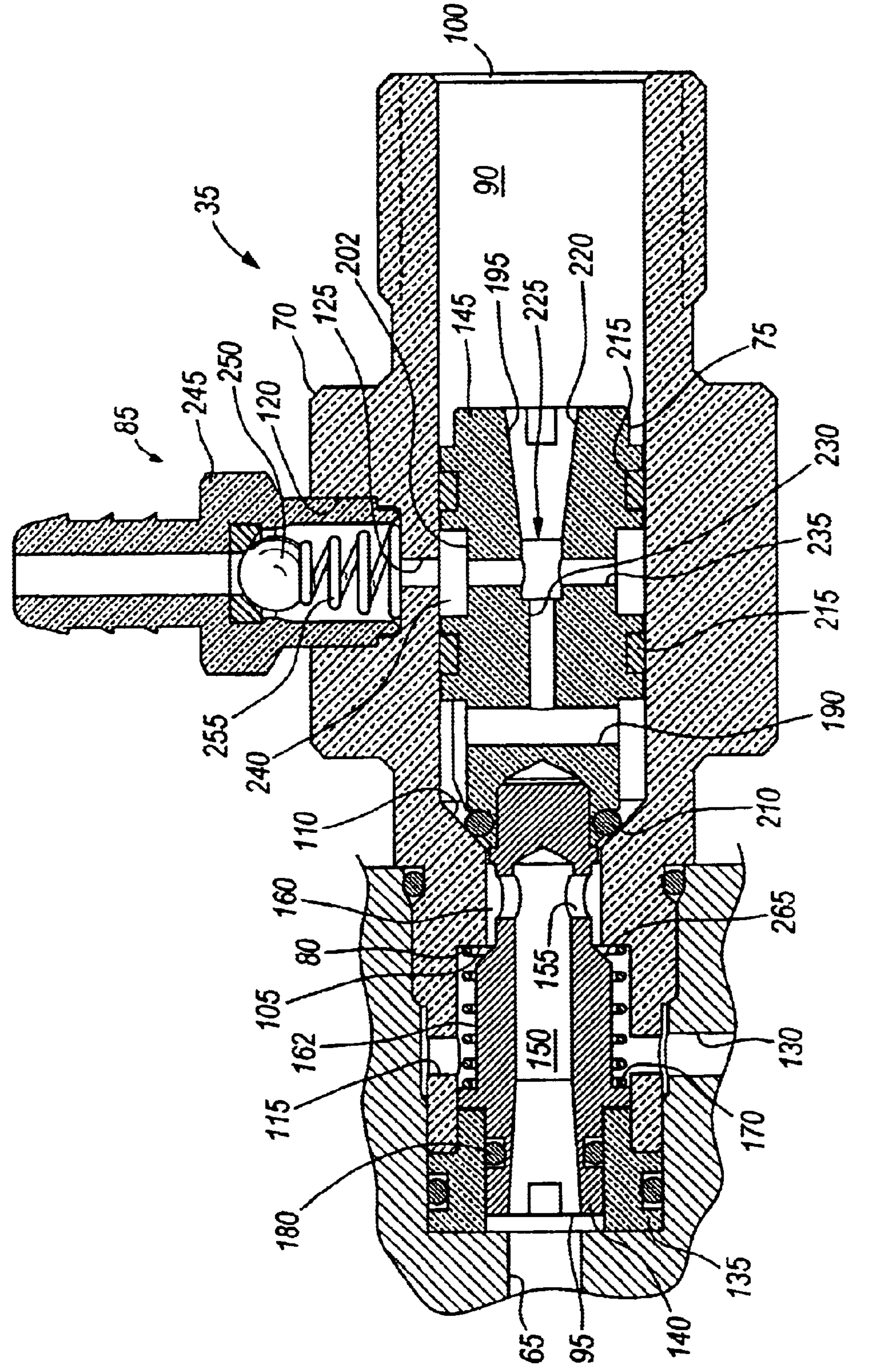
FIG. 3 is a cross-sectional view of the unloader valve of FIG. 1.

As shown in FIG. 3, the housing 70 threads into the pump 25 such that the radial bores 115 align with a bypass return hole 130. A reducer-pilot bushing 135 is sandwiched between the housing 70 and the pump 25 to provide a seal between the pump outlet 65 and the threads 72. Alternative constructions combine the reducer-pilot bushing 135 and the unloader valve housing 70.

Referring again to FIG. 2, the movable shuttle valve 75 includes a bypass member 140 and an operating member 145. The bypass member 140 defines an internal chamber 150 open at the inlet end 95 of the valve housing 70 to receive the flow of high-pressure fluid from the pump outlet 65. A plurality of radial bores 155 extend through the bypass member 140 to provide a path for the fluid out of the bypass member 140 and into a bypass chamber 160 (shown in FIG. 3). The bypass chamber 160 is defined by the housing 70 and the bypass member 140, and is in fluid communication with the radial holes 115 of the valve housing 70.

The outer surface 162 of the bypass member 140 includes an O-ring groove 165, a spring land 170, and a threaded portion 175. A first O-ring 180 fits within the O-ring groove 165 and provides a seal between the housing 70 and the bypass member 140 of the movable shuttle valve 75 near the inlet end 95. In the construction of FIG. 2, the first O-ring 180 provides a seal between the bypass member 140 and the reducer-pilot bushing 135.

The threads of the threaded portion 175 are sized to engage an opposite set of threads on the operating member 145 of the shuttle valve 75. In the construction of FIGS. 2 and 3, the male threads are located on the bypass member 140 and the female threads are on the operating member 145. Alternative constructions reverse the location of the male and female threads or use other attachment methods (e.g., welding, brazing, soldering, or quick-connects).

The operating member 145 includes a threaded portion 185, a plurality of radial inlets 190, an axial outlet 195, an O-ring groove 200, and two sliding bearing grooves 205. As discussed above, the threaded portion 185 accommodates the threaded portion 175 of the bypass member 140, thereby allowing the bypass member 140 and the operating member 145 to rigidly connect to one another.

The O-ring groove 200 and the two sliding bearing grooves 205 are located on an outer surface 202 of the operating member 145 and extend completely around. The O-ring groove 200 supports a second O-ring 210 near the threaded portion 185 of the operating member 145. The function of this O-ring 210 will be discussed below with regard to FIGS. 4–5. The sliding bearing grooves 205 each support a sliding bearing 215. The sliding bearings 215 engage the inner cylindrical surface of the housing 70 and maintain the shuttle valve 75 in the proper alignment, while minimizing friction. Preferred constructions use plastic sliding bearings 215. However, other materials are available and will function as sliding bearings 215 (e.g., brass, bronze, steel, composites, ceramics, or rubber).

The radial inlets 190 direct fluid into an internal chamber 220 defined by the operating member 145. The internal chamber 220 extends axially along the centerline of the operating member 145 and includes a venturi 225. The venturi 225 is integrally formed with the operating member 145. In other constructions, a separate venturi is fixed within the flow path of the operating member 145. The venturi 225 includes an inlet and an outlet. Between the inlet and the outlet is a throat 230 having a smaller flow area than the inlet and the outlet. A plurality of radial bores 235 connect the throat 230 of the venturi 225 to an injection chamber 240 disposed between the sliding bearings 215 and between the operating member 145 and the unloader valve housing 70. The reduced flow area of the throat 230 accelerates the flow and reduces its pressure to aid in the introduction of fluid from the injection chamber 240.

The chemical injection inlet barb 85 connects to the housing 70 adjacent the injection chamber 240 and includes a valve body 245 with a seat, a ball 250, and a spring 255. The valve body 245 threads into the unloader valve body 70, thereby trapping the ball 250 and the spring 255 within a portion of the injection chamber 240. The ball 250 rests on the seat and is biased in the closed position by the spring 255. The chemical injection inlet barb 85 is in fluid communication with a fluid or other substance (e.g., soap, ammonia solution, or other chemicals) to be injected into the injection chamber 240 and into the high-pressure stream.

FIG. 3 shows the unloader valve 35 of the invention in its assembled condition. The operating member 145 of the movable shuttle valve 75 is inserted into the unloader valve housing 70 through the outlet opening 100. The operating member 145 slides toward the inlet 95 until the second O-ring 210 abuts the angled surface 110 within the housing 70. A biasing member, in this construction a compression spring 80, slides over the bypass member 140 of the shuttle valve 75 and engages the spring land 170. The spring 80 and bypass member 140 are inserted into the unloader housing 70 through the inlet opening 95. The spring 80 engages the shoulder 105 within the housing 70 and must be compressed to insert the bypass member 140 further. The bypass member 140 and the operating member 145 engage one another and are threaded together.

The chemical injection inlet barb 85 also threads into the housing 70 to complete the assembly of the unloader valve 35.

Figure 4:
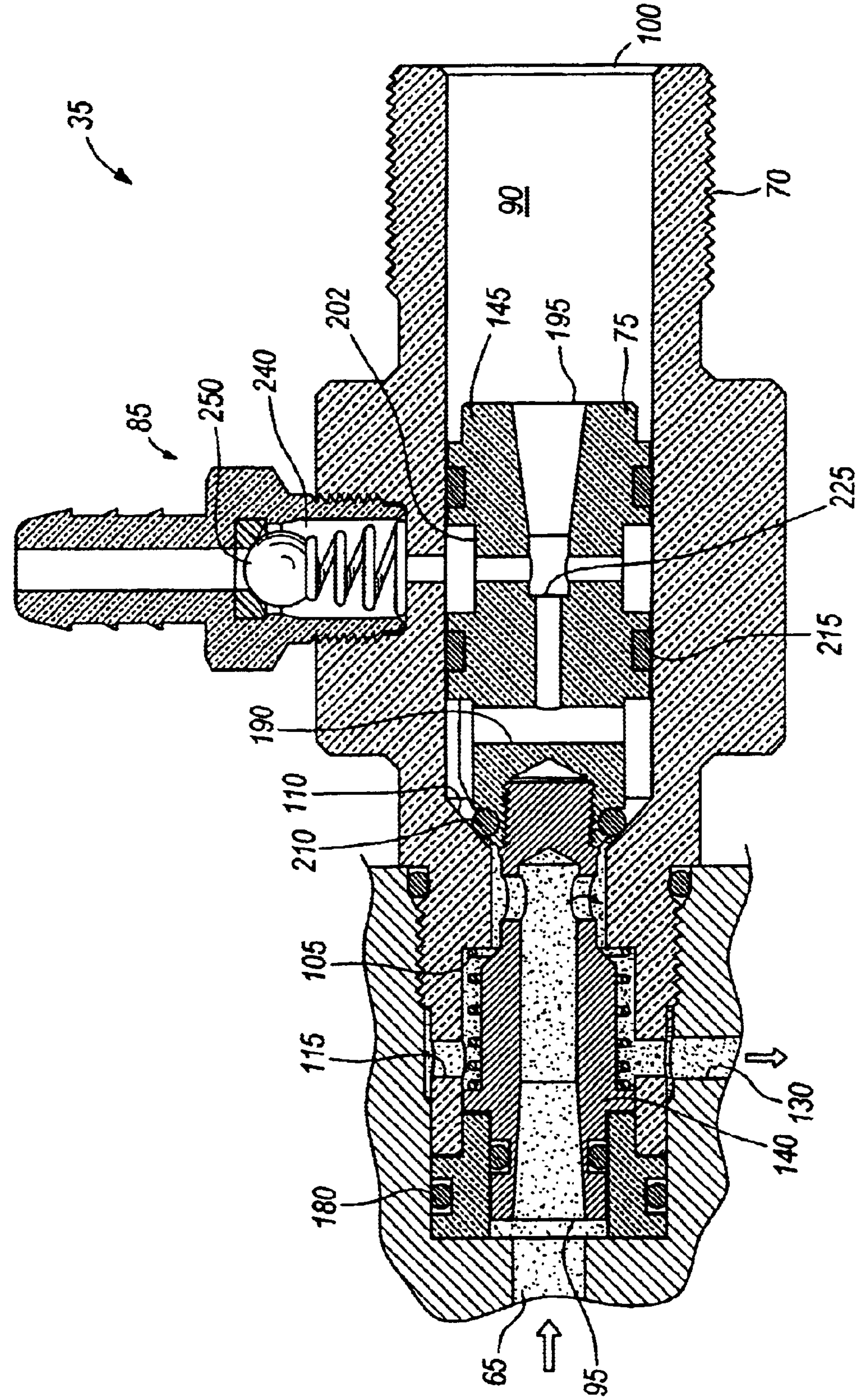
FIG. 4 is a cross-sectional view of the unloader valve of FIG. 1 in a bypass position.
Figure 5:
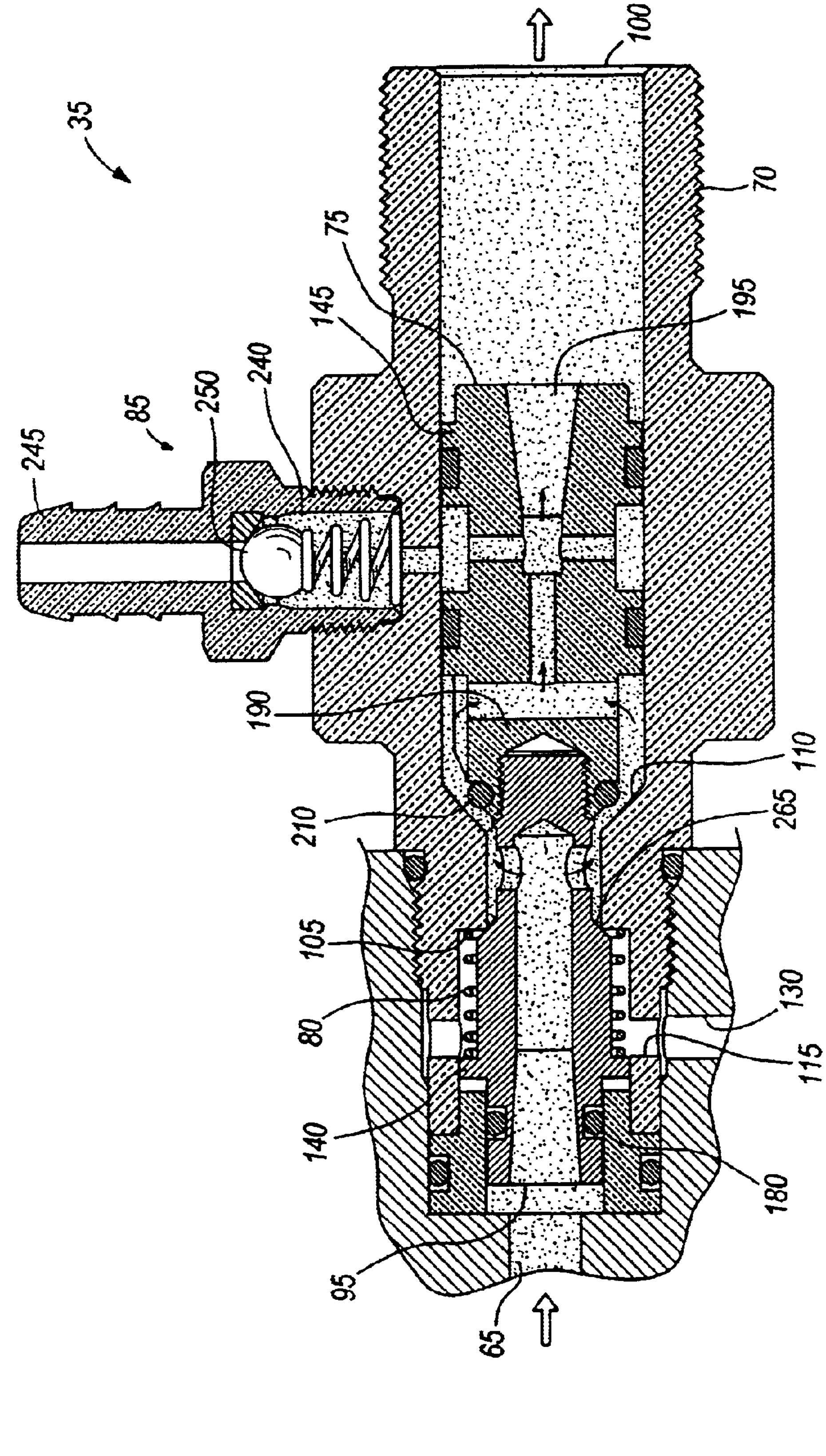
FIG. 5 is a cross-sectional view of the unloader valve of FIG. 1 in a spray position.

FIGS. 4 and 5 illustrate the unloader valve 35 in two different modes of operation. FIG. 4 illustrates the unloader valve 35 in the bypass position and FIG. 5 illustrates the valve 35 in its spray position.

Referring to FIG. 4, high-pressure flow exits the pump 25 and enters the unloader valve 35. The flow passes through the bypass member 140 and out the radial holes 155 (shown in FIG. 3). The flow enters the bypass chamber 160 defined between the first and second O-rings 180, 210 and the bypass member 140 and the housing 70. The second O-ring 210 remains sealed against the angled surface 110 of the housing 70. High-pressure fluid on the outlet side of the operating member 145, along with the force produced by the spring 80, maintain the seal force on the second O-ring 210. High-pressure flow is unable to pass into the operating member 145. Instead, the high-pressure flow passes over the outer surface of the bypass member 140 and exits the unloader valve 35 through the bypass opening 130. In preferred constructions, the bypass opening 130 is in fluid communication with the pump inlet or reservoir. The bypassed fluid thus returns to the pump 25 to be pumped through the unloader valve 35 again.

FIG. 5 illustrates the unloader valve 35 in the spray position. As described with respect to FIG. 4, the flow enters the bypass member 140 of the movable shuttle valve 75 and passes through the radial holes 155. However, the movable shuttle valve 75 is shifted toward the outlet end 100 of the unloader valve 35 when in the spray position. The shift allows an angled surface 265 of the outer surface 162 of the bypass member 140 to contact or rest near the corner of the shoulder 105 supporting the spring 80. The position of the angled surface 265 substantially reduces the flow area to the bypass outlet 130 and effectively closes off the path. However, the shift has moved the second O-ring 210 off the angled surface 110 it rested on during bypass operation, thereby providing a flow path to the outer surface 202 of the operating member 145. The first sliding bearing 215 provides a seal that forces the high-pressure fluid into the second set of radial holes 190 located in the operating member 145. The fluid passes through the radial holes 190 and into the central flow chamber 220 of the operating member 145. The flow passes through the venturi 225 disposed in the central chamber 220 and out the outlet side of the unloader valve 100. The exiting flow then passes through a pipe, tube, or hose to a spray gun 40 for use.

The flow passing through the venturi 225 accelerates as it passes through the throat 230. The local acceleration and relatively high flow velocity produce a local low-pressure region. The pressure is low enough to open the chemical injection inlet barb 85 and draw in the fluid or other material.

Overcoming or releasing the biasing force allows the unloader valve 35 to transition from the bypass position to the spray position. In preferred constructions, a control mechanism such as a user controlled valve in the spray gun 40 releases the pressure on the outlet side of the operating member 145. Once released, the pressure on the outer surface of the bypass member 140 and within the bypass member 140 is sufficient to overcome the spring biasing force and shift the movable shuttle valve 75 into the spray position. In the construction of FIG. 6, the spray gun 40 includes a trigger that directly or indirectly opens a valve. When the user depresses the trigger, the unloader valve 35 shifts to the spray position and high-pressure fluid is directed out the spray gun 40. When the user releases the trigger the pressure on the outlet side of the operating member 145 increases and equalizes the pressure on the bypass member 140, thereby allowing the spring 80 to bias the movable shuttle valve 75 into the bypass position.

In the start-up phase, the biasing spring keeps the shuttle-valve in the bypass position, thereby creating an opening to the bypass passage. At this point there is no flow through the venturi of the shuttle valve, all fluid is diverted to the bypass passage. As a result, there is no significant pressure increase to cause resistance to starting or loading of the engine.

When a user wishes to discharge high-pressure fluid from the pump, a discharge valve is opened (spray gun is triggered). This allows for the flow of fluid through the venturi of the shuttle-valve. The flow of fluid across the venturi creates a pressure differential between the two chambers. The resultant force between the two chambers overcomes the spring force, moving the shuttle valve into the spray position. When the shuttle valve is in this position, the bypass passage is closed, thereby allowing the pump pressure to rise to a suitable level for the operator to perform the desired tasks.

When the user wishes to disengage the pump, he/she simply closes the discharge valve (releases the spray gun trigger) stopping the flow of fluid across the shuttle-valve venturi. When the flow across the venturi ceases, the pressure between the two chambers begins to equalize. As the two chamber pressure values near equilibrium, the biasing spring becomes the resultant force and moves the shuttle-valve back to the bypass position. With the shuttle-valve in the bypass position, an opening is created that allows the flow of fluid to be diverted back to the bypass port.

This method for transitioning the unloader system between the bypass mode and the spray mode is commonly referred to as “flow-actuated.” The “flow-actuated” method is considered to be more desirable than pressure activated unloader systems for several reasons. Most conventional unloader systems use high-rate unloader springs that require high pressure-spikes to activate, as previously described. In contrast, the present invention monitors the flow of fluid through pressure differentials and does not require such high pressure-spikes to function. This provides smoother transitions from one mode to the next. A reduction in water hammering is seen, reducing the wear and tear of the pressure washer system. If the discharge line were to become gradually obstructed (i.e. clogged nozzle, pinched hose, etc.), the present invention would transition to the bypass mode as the flow diminished, unlike conventional unloader valves.

Another desirable benefit to using the "flow-actuated" method is the versatility that is inherent to the design. All that is required for operation is the flow of fluid, not specific pressure values that can limit applications and/or require unnecessary factory adjustments. Large variations in the motor speed are permitted, without hindering the function of the present invention.

Although the invention has been described in detail with reference to certain preferred embodiments, variations and modifications exist within the scope and spirit of the invention as described and defined in the following claims.

What is claimed is:

1. An unloader valve operable to direct a flow of fluid, the valve comprising:

a housing having a bypass opening, an inlet opening, an injection inlet, an outlet opening and an internal chamber between the inlet opening and the outlet opening;

a shuttle valve disposed within the internal chamber, the shuttle valve movable between a first position wherein the flow of fluid is substantially directed to the bypass opening and a second position wherein the flow of fluid is directed to the outlet opening, the shuttle valve including an internal flow path having a venturi therein; and a biasing member biasing the shuttle valve in the first position.

2. An unloader valve operable to direct a flow of fluid, the valve comprising:

a housing having a bypass opening, an inlet opening, an outlet opening and an internal chamber between the inlet opening and the outlet opening;

a shuttle valve disposed within the internal chamber, the shuttle valve movable between a first position wherein the flow of fluid is substantially directed to the bypass opening and a second position wherein the flow of fluid is directed to the outlet opening, the shuttle valve including an internal flow path having a venturi therein;

an injection inlet in fluid communication with the venturi, and operable to inject a second flow of fluid into the flow of fluid passing through the venturi; and a biasing member biasing the shuttle valve in the first position.

3. The unloader valve of claim 1, wherein the biasing member is a spring.

4. The unloader valve of claim 1, wherein the shuttle valve further comprises an operating member and a bypass member.

5. The unloader valve of claim 4, wherein the venturi is formed as part of the operating member and wherein the flow of fluid passes through the venturi when the shuttle valve is in the second position.

6. The unloader valve of claim 1, further comprising a sealing member operably engaging the housing to substantially prevent the flow of fluid from passing through the outlet opening when the shuttle valve is in the first position.

7. The unloader valve of claim 6, wherein the sealing member is an O-ring.

8. A pressure washer comprising:

a frame;

a control member movable between a first position and a second position;

a pump supported by the frame, the pump having an inlet and an outlet, the pump operable to draw in a low-pressure flow at the inlet and discharge a high-pressure flow to the pump outlet; and an unloader valve including a housing, a shuttle valve, and a biasing member, the housing having a bypass opening, an inlet opening, an injection opening, an outlet opening and an internal chamber between the inlet opening and the outlet opening, the shuttle valve disposed within the internal chamber and movable in response to the control member between a first position wherein the high-pressure flow is substantially directed to the bypass opening and a second position wherein the high-pressure flow is directed to the outlet opening, the shuttle valve including an internal flow path having a venturi therein, the biasing member biasing the shuttle valve in the first position.

9. A pressure washer comprising:

a frame;

a control member movable between a first position and a second position;

a pump supported by the frame, the pump having an inlet and an outlet, the pump operable to draw in a low-pressure flow at the inlet and discharge a high-pressure flow to the pump outlet;

an unloader valve including a housing, a shuttle valve, and a biasing member, the housing having a bypass opening, an inlet opening, an outlet opening and an internal chamber between the inlet opening and the outlet opening, the shuttle valve disposed within the internal chamber and movable in response to the control member between a first position wherein the high-pressure flow is substantially directed to the bypass opening and a second position wherein the high-pressure flow is directed to the outlet opening, the shuttle valve including an internal flow path having a venturi therein, the biasing member biasing the shuttle valve in the first position; and an injection inlet in fluid communication with the venturi, and operable to inject a second flow of fluid into the flow of fluid passing through the venturi.

10. The pressure washer of claim 8, wherein the biasing member is a spring.

11. The pressure washer of claim 8, wherein the shuttle valve further comprises an operating member and a bypass member.

12. The pressure washer of claim 11, wherein the venturi is formed as part of the operating member and wherein the flow of fluid passes through the venturi when the shuttle valve is in the second position.

13. A pressure washer comprising:

a frame;

a control member movable between a first position and a second position;

a pump supported by the frame, the pump having an inlet and an outlet, the pump operable to draw in a low-pressure flow at the inlet and discharge a high-pressure flow to the pump outlet;

an unloader valve including a housing, a shuttle valve, and a biasing member, the housing having a bypass opening, an inlet opening, an outlet opening and an internal chamber between the inlet opening and the outlet opening, the shuttle valve disposed within the internal chamber and movable in response to the control member between a first position wherein the high-pressure flow is substantially directed to the bypass opening and a second position wherein the high-pressure flow is directed to the outlet opening, the shuttle valve including an internal flow path having a venturi therein, the biasing member biasing the shuttle valve in the first position; and a sealing member operably engaging the housing to substantially prevent the flow of fluid from passing through the outlet opening when the shuttle valve is in the first position.

14. The pressure washer of claim 13, wherein the sealing member is an O-ring.

15. An unloader valve operable in response to a pressure change to direct a flow of fluid, the unloader valve comprising:

a housing including a first inlet, a first outlet, and a second outlet, the housing defining an internal chamber between the first inlet and the first outlet;

a shuttle valve including a first internal flow path and a second internal flow path, the shuttle valve movable between a first position and a second position in response to the pressure change, the shuttle valve cooperating with the housing to define a first outer flow path when in the first position and a second outer flow path when in the second position, such that the flow of fluid is directed from the first inlet to the second outlet via the first internal flow path and the first external flow path when the shuttle valve is in the first position and the flow of fluid is directed from the first inlet to the first outlet via the first internal flow path, the second external flow path, and the second internal flow path when the shuttle valve is in the second position; and a biasing member biasing the shuttle valve in the first position.

16. The unloader valve of claim 15, further comprising a venturi forming at least a portion of the second internal flow path.

17. The unloader valve of claim 16, wherein the housing further comprises a second inlet in fluid communication with the venturi and operable to inject a second flow of fluid into the flow of fluid passing through the second internal flow path.

18. The unloader valve of claim 16, wherein the venturi is integrally formed as part of the shuttle valve and wherein the flow of fluid passes through the venturi when the shuttle valve is in the second position.

19. The unloader valve of claim 15, wherein the shuttle valve further comprises an operating member defining at least a portion of the second internal flow path and a bypass member defining at least a portion of the first internal flow path.

20. The unloader valve of claim 15, further comprising a sealing member operably engaging the housing to prevent the flow of fluid from passing through the first outlet when the shuttle valve is in the first position.

21. The unloader valve of claim 20, wherein the sealing member is an O-ring.

22. The unloader valve of claim 15, wherein the biasing member is a spring.

* * * * *